United States Patent [19]
Sorg et al.

[11] Patent Number: 4,962,398
[45] Date of Patent: Oct. 9, 1990

[54] DISPOSABLE CAMERA WITH COLLAPSIBLE BELLOWS

[75] Inventors: James D. Sorg, 1709 Queensbridge Dr., Indianapolis, Ind. 46219; James R. Reed, Indianapolis, Ind.

[73] Assignee: James D. Sorg, Indianapolis, Ind.

[21] Appl. No.: 385,829

[22] Filed: Jul. 27, 1989

[51] Int. Cl.$^5$ .............................................. G03B 17/50
[52] U.S. Cl. ....................................... 354/86; 354/194
[58] Field of Search ................... 354/83, 85, 86, 187, 354/194

[56] References Cited

U.S. PATENT DOCUMENTS

| | | | |
|---|---|---|---|
| 524,142 | 8/1894 | Hegelein | 354/282 |
| 1,061,115 | 5/1913 | Pickard | 354/187 |
| 2,109,807 | 3/1938 | Tajima | 354/187 |
| 2,467,320 | 4/1949 | Land | 354/85 |
| 2,741,961 | 4/1956 | Anton | 354/83 |
| 3,545,358 | 12/1970 | Russell | 354/187 |
| 3,665,832 | 5/1972 | Harvey | 354/187 |
| 3,668,992 | 6/1972 | Harvey | 354/187 |
| 3,712,198 | 1/1973 | Nerwin | 354/86 |
| 4,268,149 | 5/1981 | Ettischer | 354/187 |
| 4,492,313 | 1/1985 | Touzani | 215/1 C |
| 4,518,235 | 5/1985 | Reed et al. | 354/86 |

FOREIGN PATENT DOCUMENTS 1186742  2/1965  Fed. Rep. of Germany ........ 354/85

Primary Examiner—Brian W. Brown
Attorney, Agent, or Firm—Woodard, Emhardt, Naughton, Moriarty & McNett

[57] ABSTRACT

A disposable camera having an erectable bellows. A plastic bellows includes a series of truncated, conical walls, interspaced between a second set of truncated, conical walls, all of which form equal included angles with the camera longitudinal axis. The bellows has a proximal end integrally connected to a camera box having a self-developing film packet therein. A pair of rollers apply pressure to exiting exposed film spreading development medium thereacross. A lens and shutter mechanism are affixed to the distal end of the bellows.

11 Claims, 3 Drawing Sheets

DISPOSABLE CAMERA WITH COLLAPSIBLE BELLOWS

BACKGROUND OF THE INVENTION

1. Field of the Invention

This invention is in the field of cameras, and more specifically those designed to be disposable.

2. Description of Prior Art

A recent innovation is to provide a camera which may be subsequently discarded after a single use. Such cameras may be used as a promotional item, or for use in a particular application. For example, insurance companies commonly require a photograph of the item to be insured prior to issuing a policy. Delays are thus often incurred because of the lack of availability of a camera and/or the time involved in having the film developed. It is therefore advantageous to have a camera easily mailed, instantly developing and which may be economically discarded rather than returned. Such a camera is disclosed in my abandoned U.S. patent application Ser. No. 124,270 filed on Nov. 23, 1987. The aforementioned camera included collapsible bellows for ease of shipment and developing means within the camera to allow the exposed film to be ejected from the camera in a developed state.

Additional prior cameras of interest include the camera disclosed in U.S. Pat. No. 3,712,198 issued to Nerwin. The Nerwin Patent discloses a camera having a film pack, telescoping bellows and a lens and shutter. Likewise, my U.S. Pat. No. 4,518,235 discloses a set of pressurized rollers mounted within the camera for applying pressure to the exposed film, thereby spreading the developing medium across the exposed film prior to ejectment. Earlier cameras having collapsible telescopic bellows include the U.S. Pat. No. 524,142 issued to Hegelein; U.S. Pat. No. 3,668,992 issued to Harvey; U.S. Pat. No. 1,061,115 issued to Pickard; U.S. Pat. No. 2,109,807 issued to Tagima; U.S. Pat. No. 4,268,149 issued to Ettischer; and, U.S. Pat. No. 3,665,832 issued to Harvey.

When producing a low cost throw-away camera typically from paper or plastic material, a frequent problem is to control the focal distance between the lens and the film when the bellows is in the erect state. The problem of controlling the focal length is magnified when the bellows is repeatedly collapsed and erected which depends upon the number of frames in the film Packet and the number of times the camera is stored and subsequently used. I have therefore devised a camera utilizing the film developing pressure means disclosed in my aforementioned patent within a new camera structure including a collapsible bellows which automatically insures proper setting out the focal distance. The bellows utilizes a plurality of adjacent truncated annular walls integrally connected together by a hinged structure. Collapsible annular walls have previously been known such as shown in U.S. Pat. No. 4,492,313 issued to Touzani for a collapsible soda drink bottle; however, the particular design of such a bellows in combination with a camera as disclosed herein is particularly unique and novel.

SUMMARY OF THE INVENTION

One embodiment of the present invention is a disposable camera for holding a self developing film packet comprising a main frame including a hollow interior for holding a self developing film packet with developing medium, the frame having a film exit slot for exposed film from the packet to exit from the main frame, a pressure device mounted in the frame adjacent the slot for applying pressure to the exposed film to spread the developing medium across the exposed film as the exposed film exits through the slot, a lens, camera bellows having a Proximal end mounted to the main frame and a distal end forming an aperture with the lens thereat, the bellows having a cylindrical wall with first annular portions and second annular portions integrally joined together in alternating fashion, the first annular portions and second annular portions each having a truncated conical shape and collapsible by moving the first annular portions to overlie and contact adjacent second annular portions but repeatably erectable to the same preset focal distance along a camera axis extending between the aperture and film packet whenever the camera bellows is erected, and, shutter means operatively associated with the lens operable to open and close the aperture.

It is an object of the present invention to provide a new and improved disposable camera with self-developing film.

A further object of the present invention is to provide a camera having a collapsible bellows automatically controlling the focal distance.

An additional object of the present invention is to provide a low cost and easily producible camera structure.

Related objects and advantages of the present invention will be apparent from the following description.

DESCRIPTION OF THE PREFERRED EMBODIMENT

Figure 1:
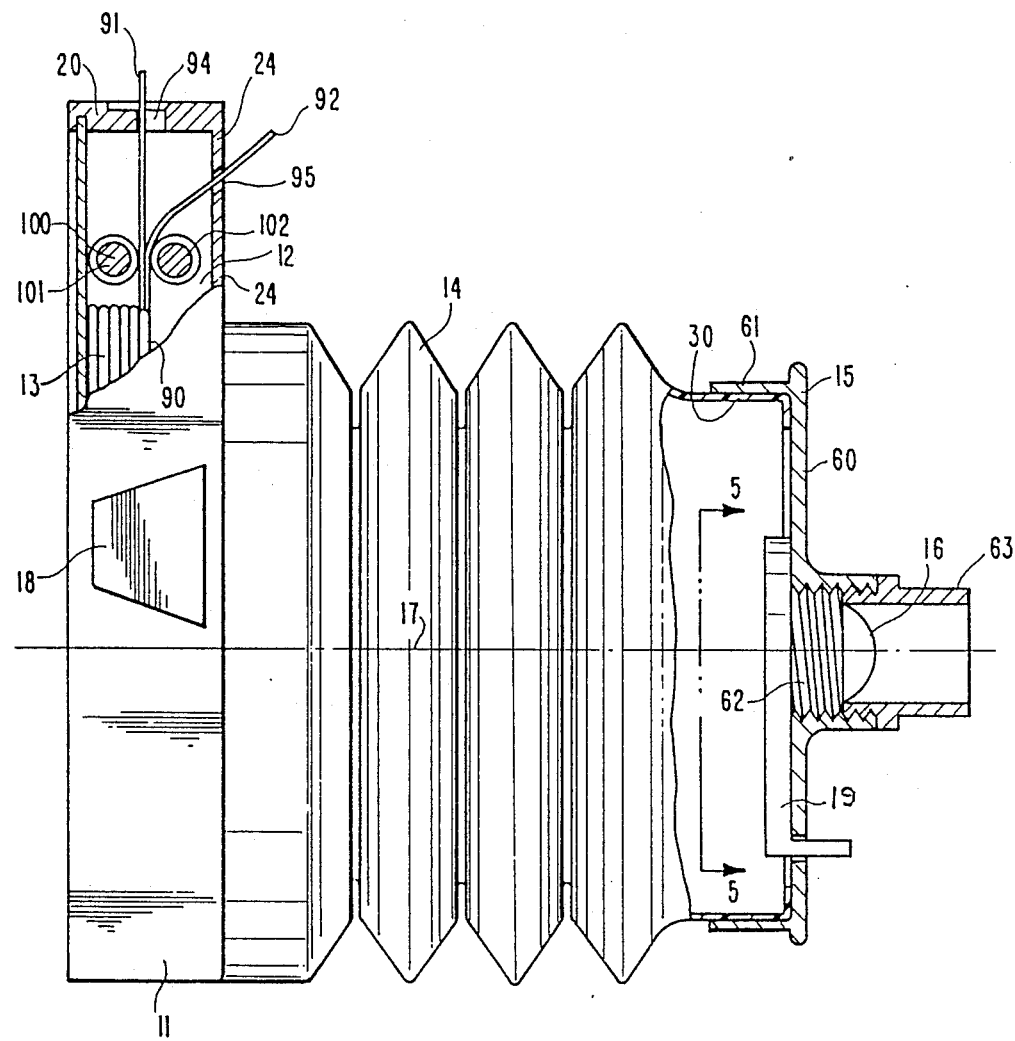
FIG. 1 is a fragmentary side view of the camera incorporating my new invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
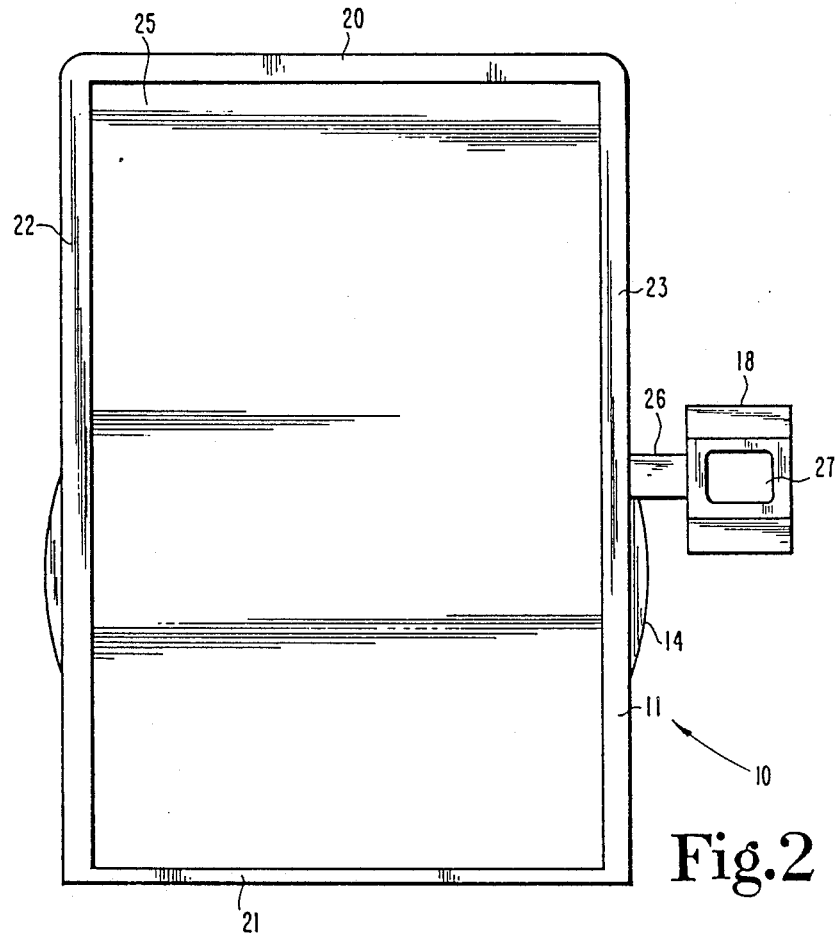
FIG. 2 is a left-hand view of the camera of FIG. 1.

Referring now more particularly to FIGS. 1 and 2, there is shown a disposable camera 10 incorporating my new invention. Camera 10 includes a main frame 11 having a hollow interior 12 for holding a commercially available self-developing film packet of conventional design with the packet including a plurality of individual film frames, each provided with a ridge of self-developing medium affixed thereto. A collapsible bellows 14 is integrally connected to main frame 11 and has a distal end with a cap 15 affixed thereto. A conventional lens 16 is provided centrally on cap 15 along the camera axis 17. A shutter mechanism 18 is affixed to the cap and is operable to controllably allow the photographic image to pass through the lens striking the outermost frame of the film packet 13. A view finder 18 is mounted to the side of main frame 11.

Main frame 11 includes a pair of end walls 20 and 21, a pair of side walls 22 and 23, and a front wall 24 integrally joined together forming a box and a hollow interior for holding film packet 13. The rear wall 25 is secured to the end walls and side walls once the film packet is inserted into the hollow interior during the initial assembly. It is not anticipated that rear wall 25 would be removed once the film packet is completely exposed since the camera is a disposable item. A boss 26 is mounted to side wall 23 and in turn has at its outer end secured to a view finder 18 with a passage 27 extending therethrough allowing the user to align the camera axis with the object to be photographed.

Figure 3:
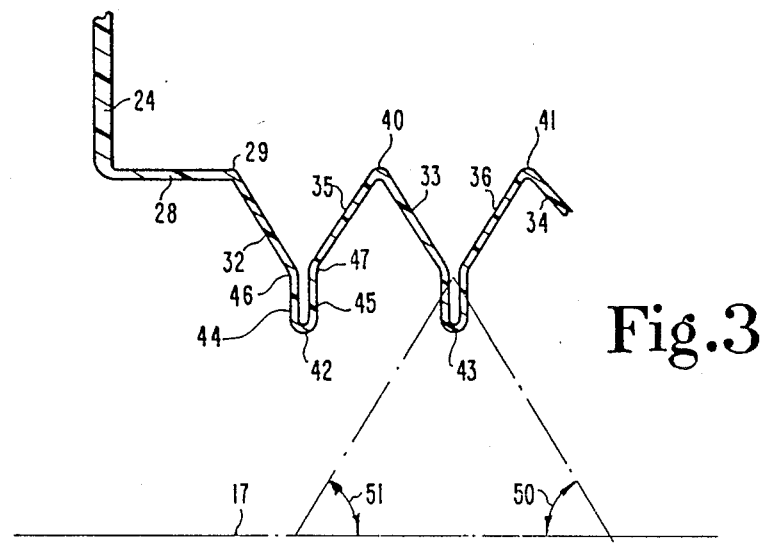
FIG. 3 is an enlarged, cross-sectional view showing a portion of the bellows in an erect state.
Figure 4:
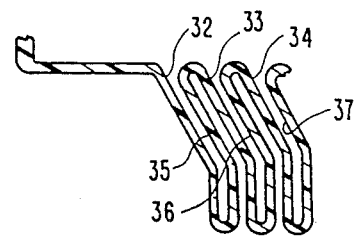
FIG. 4 is the same view as FIG. 3, only showing the bellows in a collapsed state.

A cylindrical wall 28 (FIG. 3) is integrally mounted to front wall 24 and projects outwardly therefrom being integrally joined to bellows 14. The proximal end 29 (FIG. 3) of bellows 14 is integrally joined to wall 28 with the distal end 30 (FIG. 1) of the bellows projecting in and affixed to cap 15. The bellows includes a series of first annular portions 32, 33, 34, etc. integrally joined to second annular portions 35, 36, etc. in alternating fashion. The first set of annular portions 32, 33 and 34, as well as the second annular portions, 35 and 36, each have a truncated conical shape and are collapsible by moving annular portions 35 and 36 to overlie and contact adjacent annular portions 32 and 33, but on the other hand are repeatedly erectable to the same position insuring the same pre-set focal distance along camera axis 17 extending between lens 16 and film packet 13. The left portion of the bellows is shown in the erect condition in FIG. 3 with the bellows collapsed in FIG. 4 depicting the second set of annular portions 35, 36 and 37 pivoted backward towards film packet 13, overlying and resting against the other set of annular portions 32, 33 and 34.

The bellows includes outer cylindrical fold rings 40, (FIG. 3) 41, etc. joining together the outer distal ends of adjacent annular portions. For example, outer fold ring 40 integrally joins the distal ends of adjacent annular portions 35 and 33, whereas outer fold ring 41 integrally joins together adjacent annular portions 36 and 34. The thickness of annular portions 32 through 36 are equal; however, the wall thickness at the outer fold rings 40 and 41 is reduced to facilitate the bending action of the adjacent annular portions. The inner or proximal ends of the adjacent annular portions are integrally connected together by inner cylindrical fold rings 42, 43, etc. Inner fold ring 42 will now be described, it being understood that a similar description applies to the remaining inner fold rings. Inner fold ring 42 has a pair of parallel walls 44 and 45 arranged perpendicularly relative to axis 17 when the bellows is in the erect condition. The outer end portions 46 and 47 of walls 44 and 45 are curved and integrally joined to the inner most ends of annular portions 32 and 35. Likewise, the inner most ends of walls 44 and 45 are integrally joined together. The entire bellows is integrally joined to cylindrical wall 28 and is produced with plastic along with the main frame. In the erect condition, the first set of annular portions 32, 33 and 34 are arranged at an included angle 50 relative to the longitudinal axis 17. Likewise, the second set of annular portions 35, 34, etc. are arranged at an included angle 51 relative to axis 17. The absolute value of included angles 50 and 51 are equal when the bellows is in the erect condition. When the bellows is collapsed, the adjacent annular portions will snap together extending rearwardly towards the film pack whereas when the bellows is erected, the annular portions will snap outwardly forming the included angles 50 and 51.

Cap 15 includes a wall 60 (FIG. 1) extending perpendicularly across axis 17 and is integrally attached to a skirt 61 depending therefrom surrounding the distal end 30 of the bellows. Wall 60 includes a centrally located and internally threaded hole 62 located on axis 17. A conventional lens 16 is threadedly mounted in hole 62. A cylindrical glare shield 63 extends outwardly from wall 60 surrounding lens 16.

Figure 5:
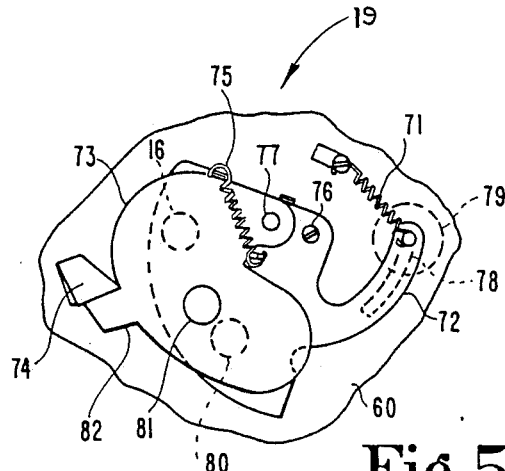
FIG. 5 is a cross-sectional view taken along the line 5—5 of FIG. 1 and viewed in the direction of the arrows showing the shutter mechanism.

Fixedly mounted to the rearwardly facing surface of wall 60 is shutter mechanism 19. Mechanism 19 may take a variety of different forms with the form shown in FIG. 5 having a pair of springs for biasing the shutter to the desired location. Mechanism 19 includes spring 71, shutter plates 72 and 73, ramp 74, and spring 75. Shutter plate 72 is pivotally mounted to wall 60 by screw 76. Shutter plate 73 is pivotally mounted to shutter plate 72 by screw 77. Also mounted to shutter plate 72 through guide hole 78 is shutter button 79 which projects outwardly from the cap. Shutter plates 72 and 73, respectively, define aperture holes 80 and 81. Springs 71 and 75, and ramp 74 act upon shutter plates 72 and 73 to maintain the stability of the shutter plates in the position shown in FIG. 5. When shutter button 79 is pushed along guide hole 78 against the biasing of spring 71, the biasing of spring 71 causes shutter plate 72 and 73 to pivot in such a manner that holes 80 and 81 come into alignment with the central aperture of the cap across which the lens 16 extends thereby exposing light upon the nearest frame of the film packet.

The action works in the following manner: spring 71 biases shutter plate 72 in a counter-clockwise direction relative to wall 60. Spring 75, on the other hand, biases shutter plate 73 in a clockwise direction relative to shutter plate 72. This counter-tension is maintained and balanced by ramp 74 which prevents the movement of shutter plate 73 in the clockwise direction to which it is biased. When a picture is taken by the moving of shutter button 79 against the biasing of spring 71, the resulting relative movement of shutter plates 72 and 73 brings shoulder 82 inwardly away from ramp 74 while increasing the tension upon spring 75. When button 79 is fully moved along guiding hole 78 and away from the biasing of spring 71, aperture hole 80 is naturally in alignment with lens 16 and when shoulder 82 slips past ramp 74, the biasing of spring 75 rapidly brings shutter plate 73 in a clockwise direction, sweeping hole 81 past hole 80 and lens 16 which are already in alignment, thus causing light to reach and expose the first layer of film in the film packet. When button 79 is then released, the biasing of spring 71 brings shutter plates 72 and 73 back into counter-clockwise direction with shoulder 82 sliding over ramp 74. After shoulder 82 has slid fully past the ramp, the ramp then acts to lock the shutter mechanism back into the position shown in FIG. 5 and ready for the taking of another picture.

Figure 6:
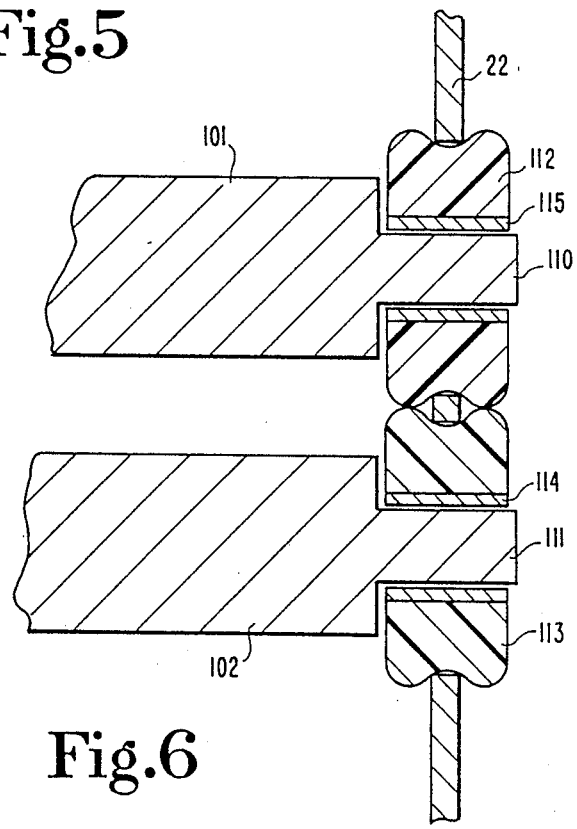
FIG. 6 is an enlarged, fragmentary view showing the mounting of one end of the pressure rollers.

Commercially available film packet 13 includes a plurality of individual frames separated apart by a paper carrier. For example, frame 90 (FIG. 1) includes the exposed frame 91 and carrier 92. Slots 94 and 95 are provided, respectively, in end wall 20 and front wall 24 allowing the exposed frame and carrier to be pulled outwardly in a conventional manner thereby positioning the next unexposed frame behind the lens. Each frame includes an envelope of developing fluid extending across the width thereof which is spread across the exposed frame as the frame is pulled outwardly. Pressure means 100 is mounted adjacent slot 94 and is operable to spread the developing means across the exposed frame. Such a pressure means is disclosed in my U.S. Pat. No. 4,518,235 which is herewith incorporated by reference. Pressure means 100 includes a pair of rollers 101 and 102 having opposite ends mounted in the two side walls 22 and 23 with the rollers extending parallel to slot 94. An elastomeric tubular spring is provided in each side wall 22 and 23 for each roller end to allow the rollers to move apart as the film is passed therebetween. That is, two elastomeric springs are mounted in side wall 22 to receive the adjacent ends of rollers 101 and 102, and two similar springs are mounted in side wall 23 to receive the opposite adjacent ends of rollers 101 and 102. A cylindrical bearing is provided in the inside diameter of each spring to receive the cylindrical roller end. Adjacent springs are positioned relative to one another so as to space the rollers .004 inch apart to allow the exposed frame and paper carrier to extend therethrough. As the carrier and frame are pulled outwardly from the film packet, the springs deflect allowing the rollers to move slightly more apart spreading the developing medium onto the exposed frame. As shown in FIG. 6, the adjacent ends 110 and 111 of rollers 101 and 102 are rotatably received within sleeves or bearings 115 and 114 in turn received within the apertures of elastomeric springs 112 and 113 mounted Lo side wall 22.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A disposable camera for holding a self-developing film packet comprising;
    a main frame including a hollow interior for holding a self-developing film packet with developing medium, said frame having a film exit slot for exposed film from said packet to exit from said main frame;
    pressure means mounted in said frame adjacent said slot for applying pressure to said exposed film to spread said developing medium across said exposed film as said exposed film exits through said slot;
    a lens;
    camera bellows having a proximal end mounted to said main frame and a distal end forming an aperture with said lens thereat, said bellows having a cylindrical wall with first annular portions and second annular portions integrally joined together in alternating fashion, said first annular portions and second annular portions each having a truncated conical shape and collapsible by moving said first annular portions to overlie and contact adjacent second annular portions by repeatably erectable to the same preset focal distance along a camera axis extending between said aperture and film packet whenever said camera bellows is erected; and,
    shutter means operatively associated with said lens operable to open and close said aperture, and wherein;
    said cylindrical wall is plastic and has outer cylindrical fold rings and inner cylindrical fold rings joining together said first annular portions and said second annular portions, said outer cylindrical fold rings have a reduced wall thickness as compared to said first annular portions and said second annular portions.
    said main frame includes an upstanding cylindrical wall integral therewith which in turn is integrally connected to said proximal end of said camera bellows limiting passage of light into said hollow interior; and further comprising;.
    a cap fixedly mounted to said distal end; and,
    a view finder mounted to said main frame, and wherein;
    said first annular portions are at a first included angle relative to said camera axis and said second annular portions are at a second included angle relative to said camera axis equal to said first included angle when said bellows is erect;
    said inner cylindrical fold rings each include a first wall and a second wall each arranged perpendicular to said camera axis with inner end portions integrally joined together about an inner diameter and outer end portions integrally joined respectively to adjacent first annular portions and second annular portions; and,
    said outer cylindrical fold rings extend about an outer diameter greater than said inner diameter.

2. The camera of claim 1 wherein:
    said pressure means includes a pair of rollers rotatably mounted to said main frame and normally spaced apart a first constant distance along their lengths, said pressure means further includes a pair of elastomeric tubular springs mounted in said main frame, each of said springs has a bearing mounted therein rotatably receiving an end of one of said rollers, said springs being compressible to allow said rollers to controllably move apart.

3. A disposable camera for holding a self-developing film packet comprising:
    a main frame including a hollow interior for holding a self-developing film packet with developing medium;
    pressure means mounted in said frame for applying pressure to exposed film from said film packet to spread said developing medium across said exposed film;
    a lens;
    camera bellows having a distal end forming an aperture with said lens thereat, said bellows having a cylindrical wall and first annular portions and second annular portions integrally joined together in alternating fashion, said first annular portions and second annular portions each having a truncated conical shape and collapsible by moving said first annular portions to overlie and contact adjacent second annular portions but repeatably erectable to the same preset focal distance along a camera axis extending between said aperture and film packet whenever said camera bellows is erected, said cylindrical wall is plastic and has outer cylindrical fold rings and inner cylindrical fold rings joining together said first annular portions and said second annular portions, said inner cylindrical fold rings each include a first wall and a second wall each arranged perpendicular to said camera axis with inner end portions integrally joined together about an inner diameter and outer end portions integrally joined respectively to adjacent first annular portions and second annular portions; and, shutter means operatively associated with said lens operable to open and close said aperture.

4. The camera of claim 3 wherein:

said main frame includes a pair of side walls, a pair of end walls and a front wall integrally joined together, said front wall includes a cylindrical wall projecting outwardly and integrally joined to said bellows, one of said end walls has a first slot through which said exposed film exits said hollow interior subsequent to exposure; and, said pressure means includes a pair of rollers rotatably mounted to said side walls immediately adjacent said slot, said rollers are normally spaced apart a first constant distance along their lengths, said pressure means further includes a pair of springs mounted in said side walls, each of said springs has a bearing mounted therein rotatably receiving an end of one of said rollers, said springs being stretchable to allow said rollers to controllably move apart as said exposed film exits through said slot and said rollers apply pressure to said exposed film.

5. The camera of claim 4 wherein:

said distal end of said bellows includes a cap affixed thereto which extends perpendicularly across said camera axis, said cap includes a centrally located and internally threaded hole on said camera axis with said lens threadedly mounted therein, said cap further includes a cylindrical skirt depending therefrom which surrounds and is attached to said distal end.

6. The camera of claim 5 wherein:

said main frame further includes a back wall attached thereto enclosing said film packet in said hollow interior with a second slot formed in said main frame adjacent said rollers extending in the same direction as said first slot allowing portions of said film packet to exit said hollow interior.

7. A disposable camera for holding a self-developing film packet comprising:

a main frame including a hollow interior for holding a self-developing film packet with developing medium, said frame having a film exit slot for exposed film from said packet to exit from said main frame;

pressure means mounted in said frame adjacent said slot for applying pressure to said exposed film to spread said developing medium across said exposed film as said exposed film exits through said slot, said pressure means includes a pair of rollers rotatably mounted to said main frame immediately adjacent said slot, said rollers are normally spaced apart a first constant distance along their lengths, said pressure means further includes a pair of elastomeric tubular springs mounted in said main frame, each of said springs has a bearing mounted therein rotatably receiving an end of one of said rollers, said springs being compressible to allow said rollers to controllably move apart as said exposed film exits through said slot and said rollers apply pressure to said exposed film;

a lens;

camera bellows having a proximal end mounted to said main frame and a distal end forming an aperture with said lens thereat, said bellows having a cylindrical wall with first annular portions and second annular portions integrally joined together in alternating fashion, said first annular portions and second annular portions each having a truncated conical shape and collapsible by moving said first annular portions to overlie and contact adjacent second annular portions but repeatably erectable to the same preset focal distance along a camera axis extending between said aperture and film packet whenever said camera bellows is erected; and, shutter means operatively associated with said lens operable to open and close said aperture; and wherein;

said bellows is plastic and has outer cylindrical fold rings and inner cylindrical fold rings joining together said first annular portions and said second annular portions, said inner cylindrical fold rings each include a first wall and a second wall each arranged perpendicular to said camera axis with inner end portions integrally joined together about an inner diameter and outer end portions integrally joined respectively to adjacent first annular portions and second annular portions.

8. The camera of claim 7 wherein:

said distal end of said bellows includes a cap affixed thereto which extends perpendicularly across said camera axis, said cap includes a centrally located and internally threaded hole on said camera axis with said lens threadedly mounted therein, said cap further includes a cylindrical skirt depending therefrom which surrounds and is attached to said distal end, said first annular portions are at a first included angle relative to said camera axis and said second annular portions are at a second included angle relative to said camera axis equal to said first included angle when said bellows is erect.

9. A disposable camera for holding a self-developing film packet comprising:

a main frame including a hollow interior for holding a self-developing film packet with developing medium;

pressure means mounted in said frame for applying pressure to exposed film from said film packet to spread said developing medium across said exposed film;

a lens;

camera bellows having a distal end forming an aperture with said lens thereat, said bellows having a cylindrical wall and first annular portions and second annular portions integrally joined together in alternating fashion, said first annular portions and second annular portions collapsible by moving said first annular portions to overlie and contact adjacent second annular portions but repeatably erectable to the same preset focal distance along a camera axis extending between said aperture and film packet whenever said camera bellows is erected, said cylindrical wall has outer cylindrical fold rings and inner cylindrical fold rings joining together said first annular portions and said second annular portions, said inner cylindrical fold rings each include a first wall and a second wall each arranged perpendicular to said camera axis with inner end portions integrally joined together about an inner diameter and outer end portions integrally joined respectively to adjacent first annular portions and second annular portions; and, shutter means operatively associated with said lens operable to open and close said aperture.

10. The camera of claim 9 wherein:

said main frame includes a pair of side walls, a pair of end walls and a front wall integrally joined together, said front wall includes a cylindrical wall projecting outwardly and integrally joined to said bellows, one of said end walls has a first slot through which said exposed film exits said hollow interior subsequent to exposure; and, said pressure means includes a pair of rollers rotatably mounted to said side walls immediately adjacent said slot, said rollers are normally spaced apart a first constant distance along their lengths, said pressure means further includes a pair of springs mounted in said side walls, each of said springs has a bearing mounted therein rotatably receiving an end of one of said rollers, said spring being stretchable to allow said rollers to controllably move apart as said exposed film exits through said slot and said rollers apply pressure to said exposed film.

11. A disposable camera for holding a self-developing film packet comprising:

a main frame including a hollow interior for holding a self-developing film packet with developing medium, said frame having a film exit slot for exposed film from said packet to exit from said main frame;

pressure means mounted in said frame adjacent said slot for applying pressure to said exposed film to spread said developing medium across said exposed film as said exposed film exits through said slot a lens;

camera bellows having a proximal end mounted to said main frame and a distal end forming an aperture with said lens thereat, said bellows having a cylindrical wall with first annular portions and second annular portions integrally joined together in alternating fashion, said first annular portions and second annular portions collapsible by moving said first annular portions to overlie and contact adjacent second annular portions but repeatably erectable to the same preset focal distance along a camera axis extending between said aperture and film packet whenever said camera bellows is erected, said bellows has outer cylindrical fold rings and inner cylindrical fold rings joining together said first annular portions and said second annular portions, said inner cylindrical fold rings each include a first wall and a second wall each arranged perpendicular to said camera axis with inner end portions integrally joined together about an inner diameter and outer end portions integrally joined respectively to adjacent first annular portions and second annular portions; and, shutter means operatively associated with said lens operable to open and close said aperture.

* * * * *